United States Patent
Nakamura

(10) Patent No.: US 6,473,229 B2
(45) Date of Patent: Oct. 29, 2002

(54) STEREOMICROSCOPE

(75) Inventor: Katsushige Nakamura, Hachioji (JP)

(73) Assignee: Mitaka Kohki Co., Ltd., Mitaka (JP)

( * ) Notice: Subject to any disclaimer, the term of this patent is extended or adjusted under 35 U.S.C. 154(b) by 0 days.

(21) Appl. No.: 09/767,222

(22) Filed: Jan. 23, 2001

(65) Prior Publication Data

US 2001/0010592 A1 Aug. 2, 2001

(30) Foreign Application Priority Data

Jan. 27, 2000 (JP) .......................................... 2000-19157

(51) Int. Cl.[7] ........................ G02B 21/22; G02B 21/00
(52) U.S. Cl. ...................... 359/377; 359/368; 359/375; 359/385
(58) Field of Search ................................ 359/368–390, 359/422, 432, 676, 363; D16/131

(56) References Cited

U.S. PATENT DOCUMENTS

| 3,186,300 A | * | 6/1965 | Littmann | |
| 3,734,593 A | * | 5/1973 | Mori | 359/376 |
| 4,341,435 A | * | 7/1982 | Lang et al. | 359/376 |
| 4,448,498 A | * | 5/1984 | Muller et al. | |
| 4,605,287 A | * | 8/1986 | Lang et al. | 359/375 |
| 4,640,588 A | * | 2/1987 | Tanaka | |
| 5,002,376 A | * | 3/1991 | Hoppl et al. | 359/377 |
| 5,052,789 A | * | 10/1991 | Kleinberg | 359/375 |
| 5,095,887 A | * | 3/1992 | Leon et al. | 359/4 |
| 5,132,837 A | * | 7/1992 | Kitajima | |
| 5,668,661 A | * | 9/1997 | Tomioka | |
| 6,097,538 A | * | 8/2000 | Watanabe et al. | 359/375 |

FOREIGN PATENT DOCUMENTS

| JP | 4-159508 | * | 6/1992 |
| JP | 6-138394 | | 5/1994 |
| JP | 7-113959 | | 5/1995 |
| JP | 7-140395 | | 6/1995 |
| JP | 10-333047 | | 12/1998 |

* cited by examiner

Primary Examiner—Thong Nguyen
(74) Attorney, Agent, or Firm—Oblon, Spivak, McClelland, Maier & Neustadt, P.C.

(57) ABSTRACT

A stereomicroscope has an objective system, a zoom system, and an eyepiece system. The zoom system consists of two systems that are juxtaposed at the same height. This arrangement reduces the vertical size of a body (2) of the stereomicroscope, allows an observer to easily see a target below the stereomicroscope with the naked eye as and when required, and improves workability when an assistant microscope (7) is attached to the stereomicroscope.

13 Claims, 6 Drawing Sheets

STEREOMICROSCOPE

BACKGROUND OF THE INVENTION

1. Field of the Invention

The present invention relates to a stereomicroscope capable of providing a stereoscopic image of an object.

2. Description of the Related Art

A stereomicroscope is used for, for example, brain surgery to provide a stereoscopic image of a target. The stereomicroscope has an inlet opening formed at a lower part of the body of the stereomicroscope. The inlet opening receives a flux of light reflected from a target. The light flux passes through an objective system, a zoom system, and an eyepiece system to the eyes of an observer. Usually, the objective and zoom systems are vertically stacked one upon another above a target. The stacked configuration is vertically long to elongate the distance from eyepieces at the top of the stereomicroscope to the inlet opening at the bottom of the stereomicroscope. Due to the long distance to a target, a doctor who sees the target through the stereomicroscope must stretch his or her arms when operating on the target. This deteriorates the doctor's workability.

To cope with this problem, Hanzawa disclosed a stereomicroscope of new structure in Japanese Unexamined Patent Publication No. 6-138394. This stereomicroscope has objective and zoom systems that are horizontally arranged above a target, to reduce the vertical size of the stereomicroscope. The objective and zoom systems of Hanzawa are each a single system employing large lenses. The objective system is horizontal, and therefore, must employ an optical element at an inlet opening to orthogonally reflect an incoming light flux.

A stereomicroscope is frequently provided with an assistant microscope so that a surgery assistant may observe a target or study surgery techniques. The assistant microscope is in one body with the stereomicroscope, to share objective and zoom systems with the stereomicroscope.

The conventional stereomicroscopes mentioned above usually employ a single zoom system consisting of large lenses that pass two light fluxes through peripheral parts of each lens. Due to the large lenses of the zoom system, an objective system that is contiguous to the zoom system must employ large lenses, too. Since the lenses of the objective system are in the vicinity of an inlet opening for receiving light from a target, the inlet opening must also be large. The large inlet opening hinders a doctor from observing a target under the inlet opening with the naked eye when the doctor shifts his or her eyes from eyepieces of the stereomicroscope. It is frequent that a doctor observes a target alternately with the stereomicroscope and with the naked eye. Thus the stereomicroscope of broad width interferes with the doctor's sight.

The stereomicroscope with a horizontal objective system must have an additional optical element at an inlet opening to orthogonally reflect a vertical light flux from a target into the objective system. Such an additional optical element involves a curved optical axis to elongate an optical path from a target to the objective system. Accordingly, the inlet opening must be large to observe a wide area at low magnification. The large inlet opening hinders doctor's sight, increases the number of parts, and complicates the peripheral structure of the inlet opening.

The stereomicroscope with an integrated assistant microscope has a problem of hardly removing the assistant microscope when it is not needed. The assistant microscope shares optical systems with the stereomicroscope, and therefore, it is impossible to separately adjust the magnifications of the assistant microscope and stereomicroscope. This hinders combinational surgery by two doctors with a main doctor using the stereomicroscope to operate on a deep part of a target and an assistant doctor using the assistant microscope to operate on a shallow part of the target.

SUMMARY OF THE INVENTION

An object of the present invention is to provide a stereomicroscope of reduced vertical size to enable a doctor to easily observe a target with the naked eye from around eyepieces of the stereomicroscope. The stereomicroscope has an assistant microscope that is easily attached to and detached from the stereomicroscope.

In order to accomplish the object, a first aspect of the present invention provides a stereomicroscope having a vertical objective system, a horizontal zoom system, and an eyepiece system. The zoom system consists of two systems that are juxtaposed at the same level.

The two horizontal zoom systems and the vertical objective system reduce the vertical size of the stereomicroscope and the lens diameter of the objective system. The two zoom systems are made of small lenses. This is because, compared with a single-zoom-system configuration that passes two light fluxes through peripheral parts of each lens, the two-zoom-system configuration passes two light fluxes through the centers of respective lenses. To achieve the same magnification, the two-zoom-system configuration needs a shorter distance between two light fluxes (i.e., the two zoom systems) than the single-zoom-system configuration. As a result, the two-zoom-system configuration can employ small lenses, and in addition, reduce the lens diameter of the objective system arranged in the vicinity of the zoom systems, thereby reducing the size of the inlet opening for receiving light from a target. Consequently, the stereomicroscope of the first aspect is horizontally slim to allow a doctor to easily observe a target under the stereomicroscope with the naked eye when the doctor shifts his or her eyes from the eyepieces of the stereomicroscope.

According to the first aspect; the vertical objective system directly receives vertically scattered light from a target. The objective system needs no additional optical element to bend an optical axis, and therefore, the length of an optical path from a target to the objective system can be shortened. This secures a wide view area at low magnification even with a small inlet opening. The stereomicroscope of the first aspect, therefore, is compact, involves a reduced number of parts, and is simple in structure around the inlet opening thereof.

A second aspect of the present invention provides a stereomicroscope having an objective system, a zoom system, an eyepiece system, and an assistant microscope. The stereomicroscope has an inlet opening to receive a flux of light from a target, and the assistant microscope is attachable to and detachable from the inlet opening from a target side.

The assistant microscope is detached from the stereomicroscope if not needed, so that an observer may secure a wide view around the stereomicroscope when the observer sees a target under the stereomicroscope with the naked eye. The assistant microscope is attached to the inlet opening of the stereomicroscope. When the assistant microscope is detached from the stereomicroscope, the inlet opening is open to a target and the stereomicroscope completely works by itself without the assistant microscope so that an observer may observe the target with the stereomicroscope alone. The assistant microscope has optical systems that are independent of those of the stereomicroscope, and therefore, the magnification of the assistant microscope is adjustable separately from the stereomicroscope. This makes combinational surgery easier. For example, a main doctor may use the stereomicroscope to operate on a deep part of a target while an assistant doctor uses the assistant microscope to operate on a shallow part of the target.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DESCRIPTION OF THE PREFERRED EMBODIMENT

Figure 1:
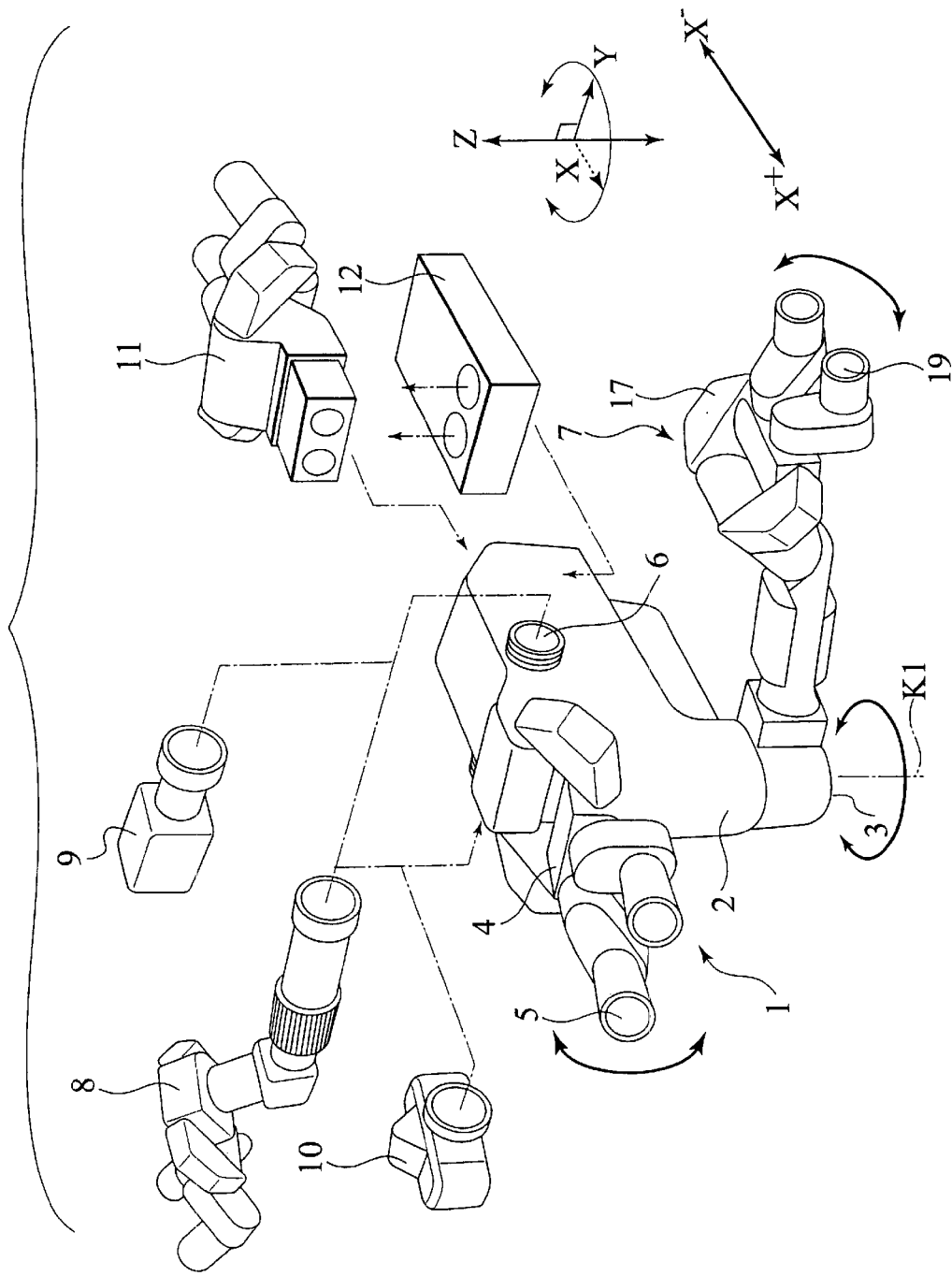
FIG. 1 is a perspective view showing a stereomicroscope according to a first embodiment of the present invention.
Figure 2:
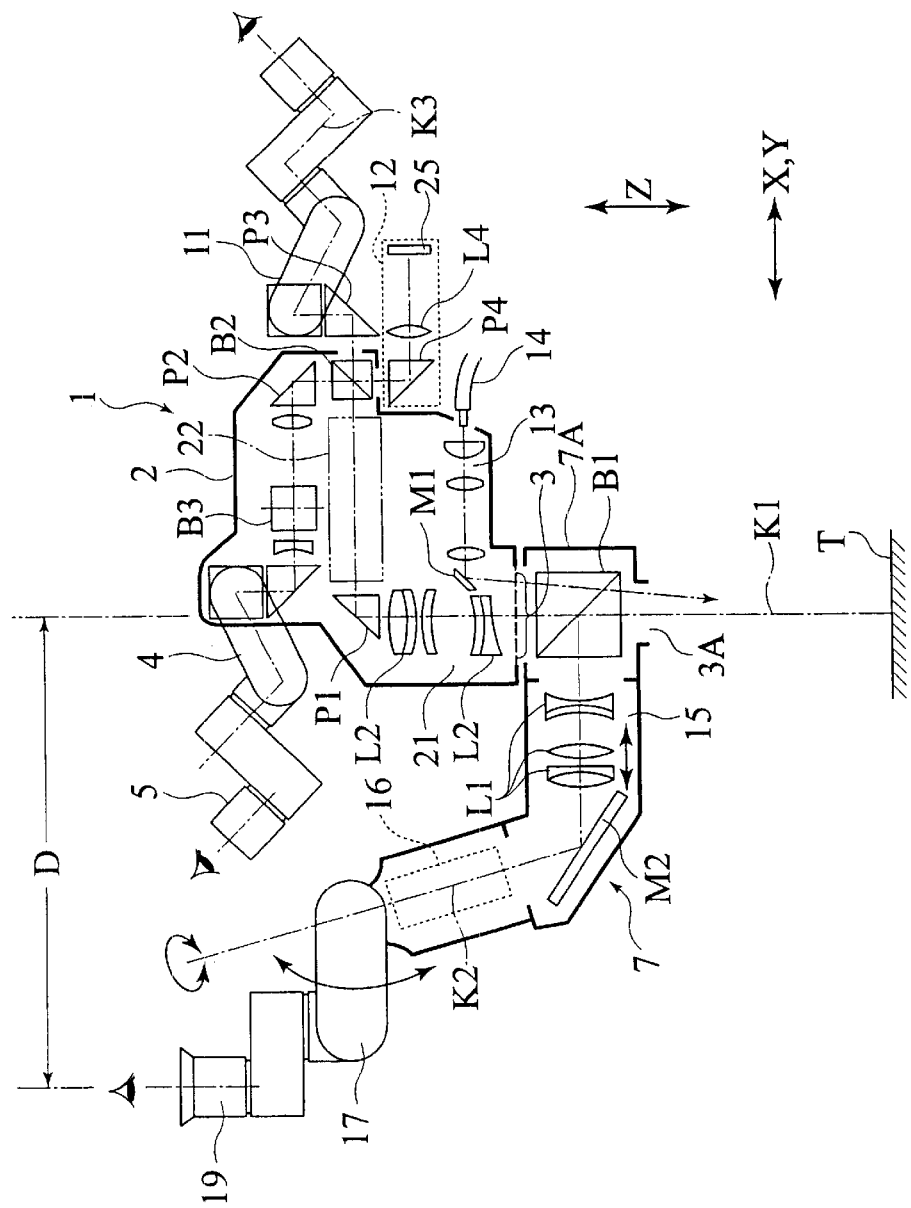
FIG. 2 is a sectional view showing optical systems of the stereomicroscope of the first embodiment.
Figure 3:
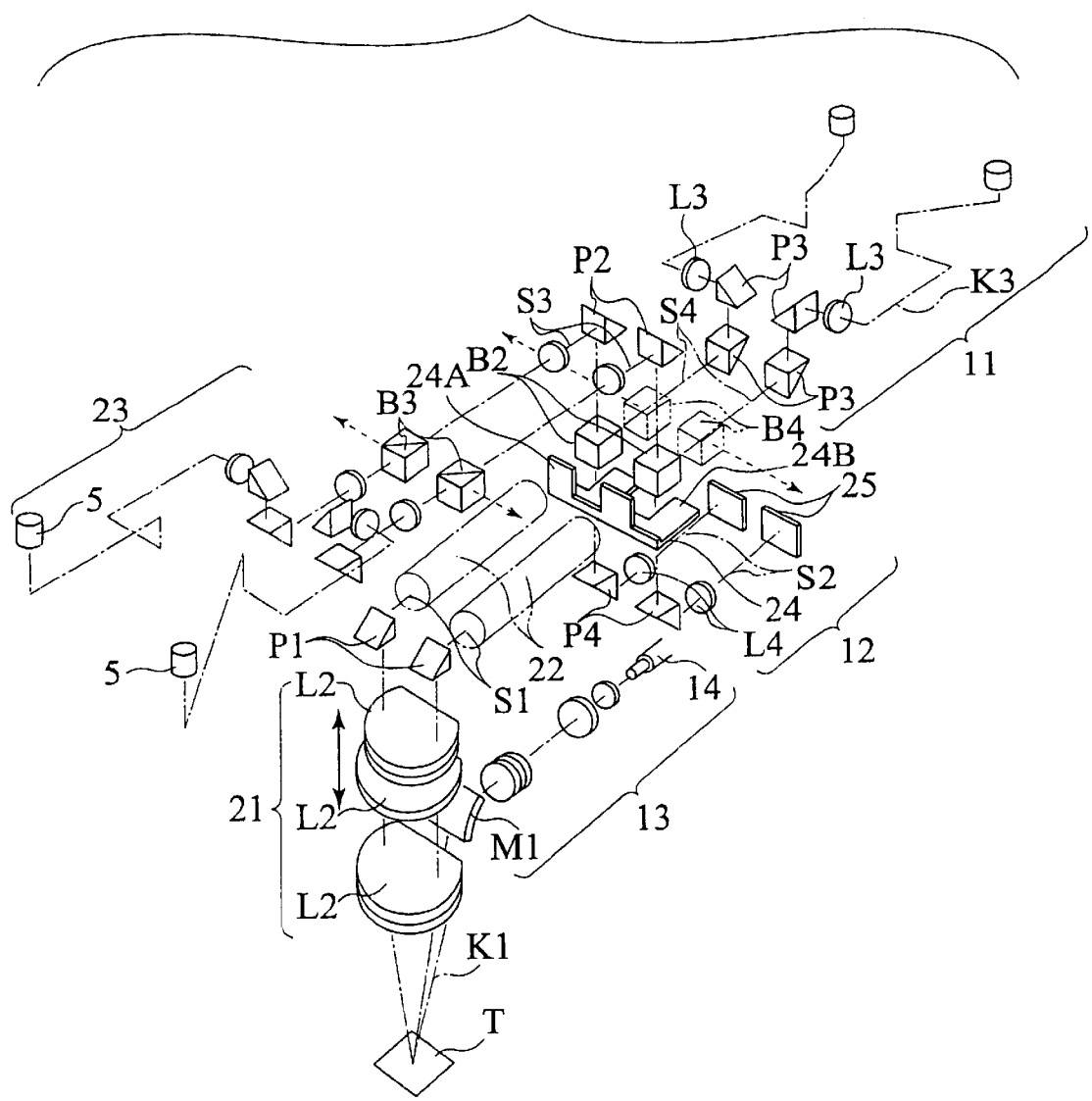
FIG. 3 is a perspective view showing the optical systems of the stereomicroscope of the first embodiment.

FIGS. 1 to 4 show a stereomicroscope according to the first embodiment of the present invention. In the following explanation, an $X^+$ side shown in FIG. 1 is a front side, an $X^-$ side is a rear side, an axis Z indicates a vertical direction, and a plane perpendicular to the vertical direction Z including axis X corresponds to any horizontal direction Y.

The stereomicroscope 1 is usable as an operation microscope and has a body 2 and various accessories to be attached to the body 2. The body 2 has an inlet opening 3 at a front bottom part thereof to receive a light flux K1 from a target T. The body 2 has a variable body tube 4 at a front top part thereof. The body tube 4 can be vertically tilted and has eyepieces 5, which are adjustable in left and right directions according to the distance between observer's eyes.

The inlet opening 3 is substantially under a view point of the body tube 4. A middle part of the body 2 between the body tube 4 and the inlet opening 3 is slim and extends toward the rear side. The body 2 has side openings 6 each for providing a light flux. The accessories to be attached to the stereomicroscope 1 as and when required include a stereoscopic assistant microscope 7 attached to the inlet opening 3 from below, an assistant monocular microscope 8 attached to the side opening 6, a photographing unit 9 such as a video camera attached to the side opening 6, a still camera 10 attached to the side opening 6, a counter microscope 11 attached to a rear end of the body 2 from the rear side, and a compact image monitor 12 attached to a rear end of the body 2 from below. The photographing unit 9 is preferably a video camera employing solid-state photographing elements such as CCD image sensors because such video camera is light and highly sensitive. These accessories are attached to the body 2 with conventional attachments.

The body 2 is just above the target T. A vertical light flux K1 from the target T is received by the inlet opening 3 of the body 2. A lower part of the body 2 incorporates a horizontal illumination system 13 to illuminate the inlet opening 3. An optical fiber 14 guides illuminating light of given width into the illumination system 13, and a mirror M1 reflects the light to obliquely illuminate the target T at a given angle with respect to the light flux K1. Due to the oblique illuminating light, the target T produces shadows to provide effective parallax so that an observer may stereoscopically see the target T.

Figure 4:
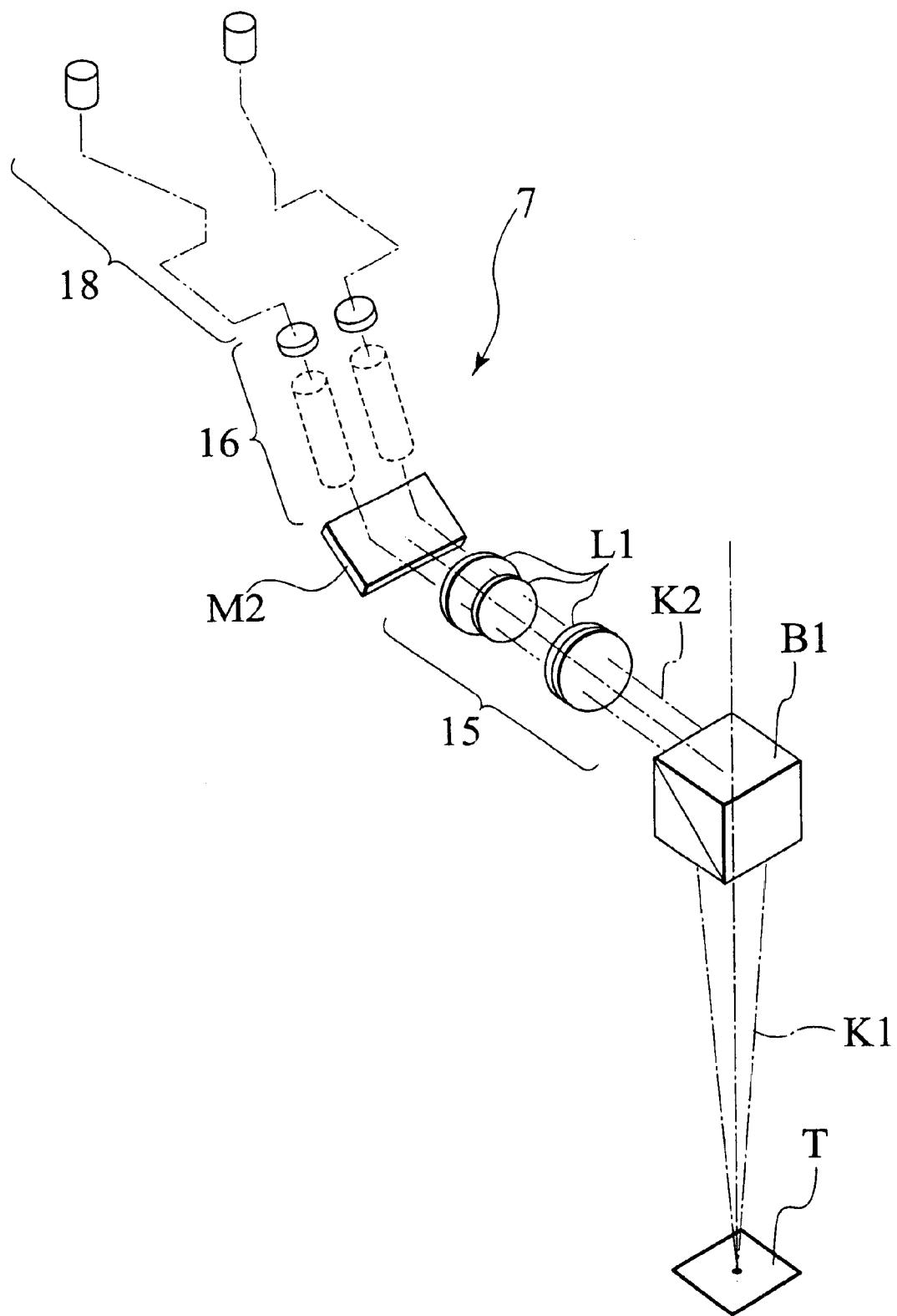
FIG. 4 is a perspective view showing optical systems of an assistant microscope attached to the stereomicroscope of the first embodiment.

The assistant microscope 7 has a branching unit B1 such as a beam splitter or a half mirror. The branching unit B1 branches a light flux K2 for the assistant microscope 7 from the light flux K1. The assistant microscope 7 has a horizontal objective system 15, which consists of three lenses L1 arranged at the same height as the branching unit B1. In FIG. 4, the light flux K2 is passed through the objective system 15 and is reflected by a mirror M2 into left and right zoom systems 16 that are oblique with respect to the mirror M2. The light flux K2 is passed through each zoom system 16 into a variable body tube 17. Then, the light flux K2 is passed through an internal eyepiece system 18 to provide images for eyepieces 19.

The stereoscopic optical systems of the assistant microscope 7 are independent of those of the body 2, so that the magnification of the assistant microscope 7 is separately adjustable from that of the body 2. To carry out surgery with the stereomicroscope 1, a main doctor uses the body 2 to observe the target T and operate on a deep part of the target T while an assistant doctor uses the assistant microscope 7 to operate on a shallow part of the target T. In this way, the body 2 and assistant microscope 7 of the stereomicroscope 1 enable two doctors to easily and speedily carry out combinational surgery.

The assistant microscope 7 is detached from the body 2 if it is not required. Detaching the assistant microscope 7 from the body 2 expands the sight of the main doctor when the main doctor shifts his or her eyes from the eyepieces 5 to see the target T with the naked eye. The assistant microscope 7 has a fitting part 7A to the body 2. The fitting part 7A incorporates the branching unit B1. The fitting part 7A is attached to the inlet opening 3 of the body 2 from below. When the assistant microscope 7 is detached from the body 2, the body 2 is complete by itself with the inlet opening 3 being open at the bottom of the body 2. Accordingly, the body 2 without additional optical elements is sufficient to observe the target T. If the assistant microscope 7 is needed for combinational surgery, it is quickly attached to the body 2.

The branching unit B1 of the assistant microscope 7 is on an optical axis of the body 2 and branches a light flux from the optical axis without changing the optical axis. Namely, the optical axis of the body 2 is not affected by the presence or absence of the branching unit B1. The branched light flux K2 is obtainable only by adding the branching unit B1 into the optical axis of the body 2. Namely, the light flux K2 is obtainable with a minimum influence on the optical path of the body 2 and minimum additional parts to the assistant microscope 7. The zoom systems 16 are inclined to reduce a horizontal distance D from the inlet opening 3 of the body 2 to the eyepieces 19 of the assistant microscope 7. When an assistant doctor operates on the target T, the short distance D brings the doctor closer to the target T so that the doctor may easily and properly work on the target T.

The light flux K1 is passed through the branching unit B1, which may be a beam splitter, and is focused through the vertical objective system 21. The objective system 21 consists of three lenses L2. The lenses L2 are cut on the illumination system 13 side so that the lenses L2 may not interfere with the illumination system 13 when the lenses L2 are moved. The light flux K1 passed through the objective system 21 is reflected by a prism P1 toward the rear side into the horizontal two juxtaposed zoom systems 22. The zoom systems 22 are extended from the top of the objective system 21 toward the rear side of the body 2 opposite to the variable body tube 4, so that the zoom systems 22 may not interfere with the body tube 4. Each of the zoom systems 22 is composed of a pair of lenses of small diameter and a pair of movable lenses of smaller diameter. The small diameter of each zoom system 22 cancels the height of the vertical objective system 21.

The light flux K1 passed through each zoom system 22 is branched by a branching unit B2 and is reflected by a prism P2 into the variable body tube 4. The light flux K1 reaches an eyepiece system 23 to provide images for the eyepieces 5. In front of the eyepiece system 23, there is a branching unit B3 for branching the light flux into left and right branch fluxes, which are taken out of the side openings 6.

The branching unit B2 after each zoom system 22 passes a partial light flux K3 for the counter microscope 11 attached 40 to a rear end of the body 2. The counter microscope 11 has left and right prisms P3 and lenses L3, to provide stereoscopic images like the variable body tube 4. A branching unit B4 may be arranged in front of the counter microscope 11, to provide a branch flux for a side opening (not shown) formed on each side face of the body 2. These side openings provide, for example, a camera with the same images as those for the counter microscope 11. The counter microscope 11 is used when opposing two doctors carry out, for example, plastic surgery or spine surgery. The counter microscope 11 is easy to detach when not used. If the counter microscope 11 is not required, the branching unit B2 maybe replaced with a prism or a mirror to provide the variable body tube 4 with brighter images.

The branching unit B2 such as a beam splitter is arranged just after each zoom system 22 an d has a shutter 24 that is slidable orthogonally to an optical axis. Behind the shutter 24, the monitor 12 is installed from below. The monitor 12 is, for example, a liquid crystal monitor. The monitor 12 provides an electronic image, which is passed through a lens L4 and a prism P4 into the branching unit B2. The electronic image is visible by the variable body tube 4 and counter microscope 11. The electronic image may be picked up from the side openings 6 for an accessory. The electronic image is displayed on a screen 25. The electronic image may be a CT image, a MRI image, or an arrow mark provided by an surgery supporting navigation system. The image provided by the monitor 12 may be plane images or left and right images involving parallax to form stereoscopic images. The monitor 12 may have an audio unit to provide surgery supporting audio information.

The shutter 24 consists of a first shutter 24A for selectively blocking a light flux from a target and a second shutter 24B for selectively blocking a light flux from the monitor 12. The first shutter 24A is arranged on each optical axis S1 that passes a light flux from a target. The first shutter 24 A is positioned on the target side of a point (B2) where a light flux from a target is combined with a light flux from the monitor 12. When the first shutter 24A is operated to block a light flux from a target, the variable body tube 4 (optical axes S3) and counter microscope 11 (optical axes S4) provide only electronic images from the monitor 12. The second shutter 24B is arranged on each optical path S2 that passes a light flux from the monitor 12. The second shutter 24B is positioned on the monitor 12 side of the point (B2) where a light flux from a target is combined with a light flux from the monitor 12. When the second shutter 24B is operated to block- a light flux from the monitor 12, the variable body tube 4 and counter microscope 11 provide only images from a target. The embodiment of FIG. 3 integrates the first and second shutters 24A and 24B into the shutter 24, to selectively block a light flux from a target or a light flux from the monitor 12. It is possible to separately arrange the first and second shutters 24A and 24B so that they can operate independently of each other.

When the shutter 24 is operated to block no light fluxes, the variable body tube 4 and counter microscope 11 provide an image of a target overlapped with an electronic image from the monitor 12. In this case, the electronic image overlaps the target image without partially blocking the target image. Namely, a wide view of the target is secured. The overlapping electronic image may be a three-dimensional image or an instruction. If the monitor 12 provides no electronic image, only the target image will be seen.

The monitor 12 is easy to remove for repairing or adjustment. The monitor 12 is opposite to the variable body tube 4 with the body 2 interposing between them, and therefore, does not complicate the structure of the variable body tube 4. If the monitor 12 must be arranged on the variable body tube 4 side, the eye-to-eye distance adjusting mechanism and tilting mechanism of the variable body tube 4 must have intricate optical systems to handle a focal (parallel) light fluxes. To avoid this, the present invention arranges the monitor 12 opposite to the variable body tube 4. This prevents an observer who works on the variable body tube 4 from hitting the monitor 12.

According to the first embodiment, the body 2 employs the horizontal two zoom systems 22 and the vertical objective system 21. This arrangement maintains the height of the body 2 and reduces the diameters of the lenses L2 of the objective system 21. Namely, the first embodiment selects, in front of the zoom systems 22, light fluxes for the zoom systems 22 and substantially blocks the remaining light fluxes. This results in reducing the lens diameters of the zoom systems 22 and passing each light flux K1 through the center of the lenses of each zoom system 22. On the other hand, a conventional microscope employing a single zoom system passes two light fluxes through peripheral parts of each lens of the zoom system and must consider a margin or a gap between the two light fluxes so that they do not interfere with each other. As a result, to achieve the same magnification as the first embodiment, the conventional microscope must employ large-diameter lenses that involve useless spaces where no effective light fluxes pass through. The zoom systems 22 of the first embodiment pass light fluxes through separate optical paths, to reduce the diameter of each lens. This results in reducing the diameter of the inlet opening 3. The sizes and shapes of the lenses of the first embodiment may properly be determined according to light fluxes, to minimize useless spaces where no effective light fluxes pass through. Reducing the lens sizes minimizes the horizontal width of a lower part of the body 2, so that a doctor working on the body 2 may shift his or her eyes from the eyepieces 5 to easily see a target under the body 2 with the naked eye. Each lens of the body 2 passes a light flux axial symmetrically to improve the resolution and aberration characteristics of the stereomicroscope 1.

The vertical objective system 21 directly receives the light flux K1 vertically reflected from the target T. The objective system 21 employs no additional optical elements to change an optical path of the light flux K1. This shortens the length of an optical path from the target T to the objective system 21, enables the small inlet opening 3 to observe a wide area at low magnification, and makes the periphery of the inlet opening 3 compact. Needing no additional optical elements such as prisms to change an optical axis, the objective system 21 reduces the number of parts, simplifies the structures of the inlet opening 3 and the periphery thereof, and secures a work space.

Figure 5:
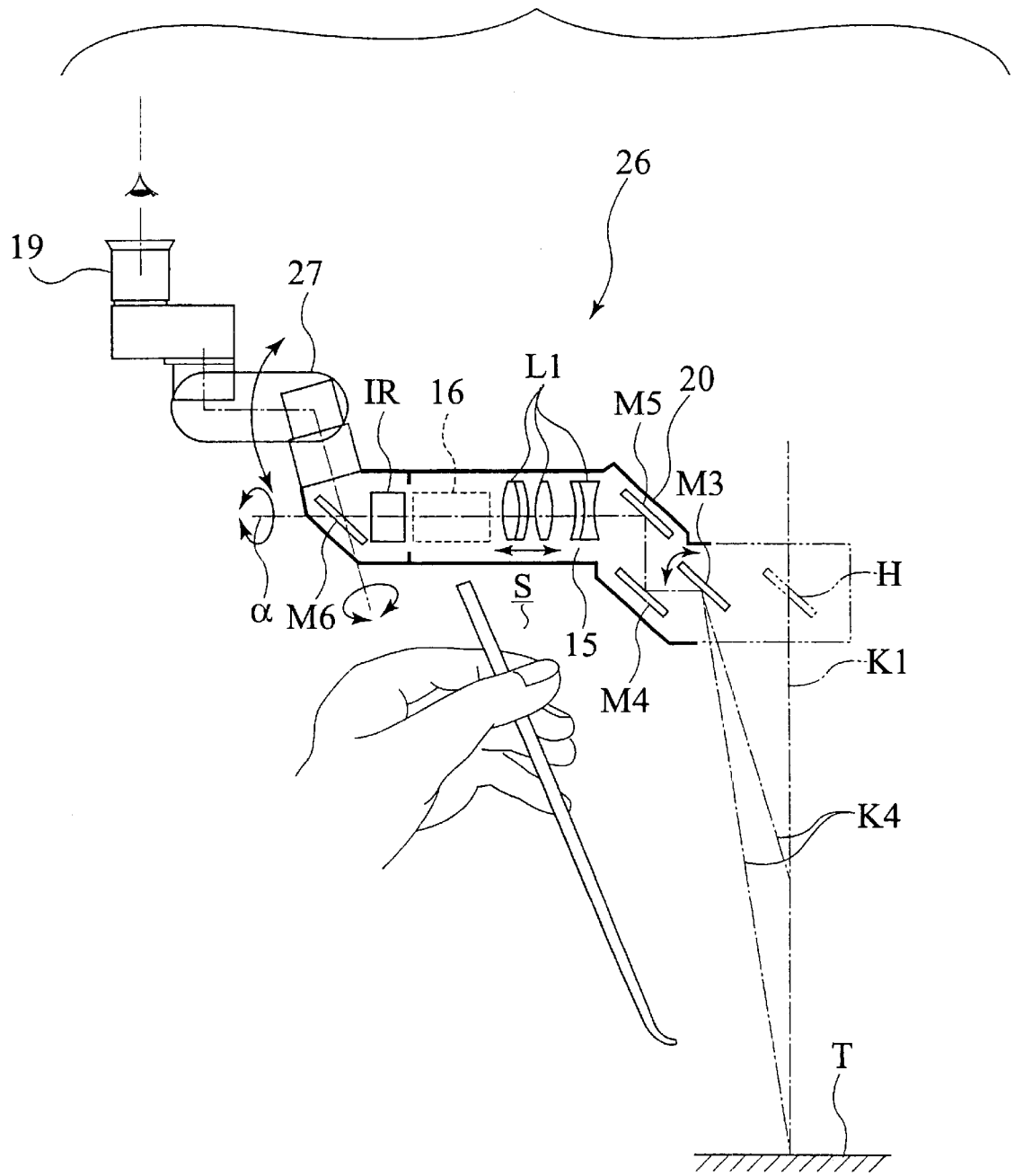
FIG. 5 is a perspective view showing optical systems of an assistant microscope according to a second embodiment of the present invention.
Figure 6:
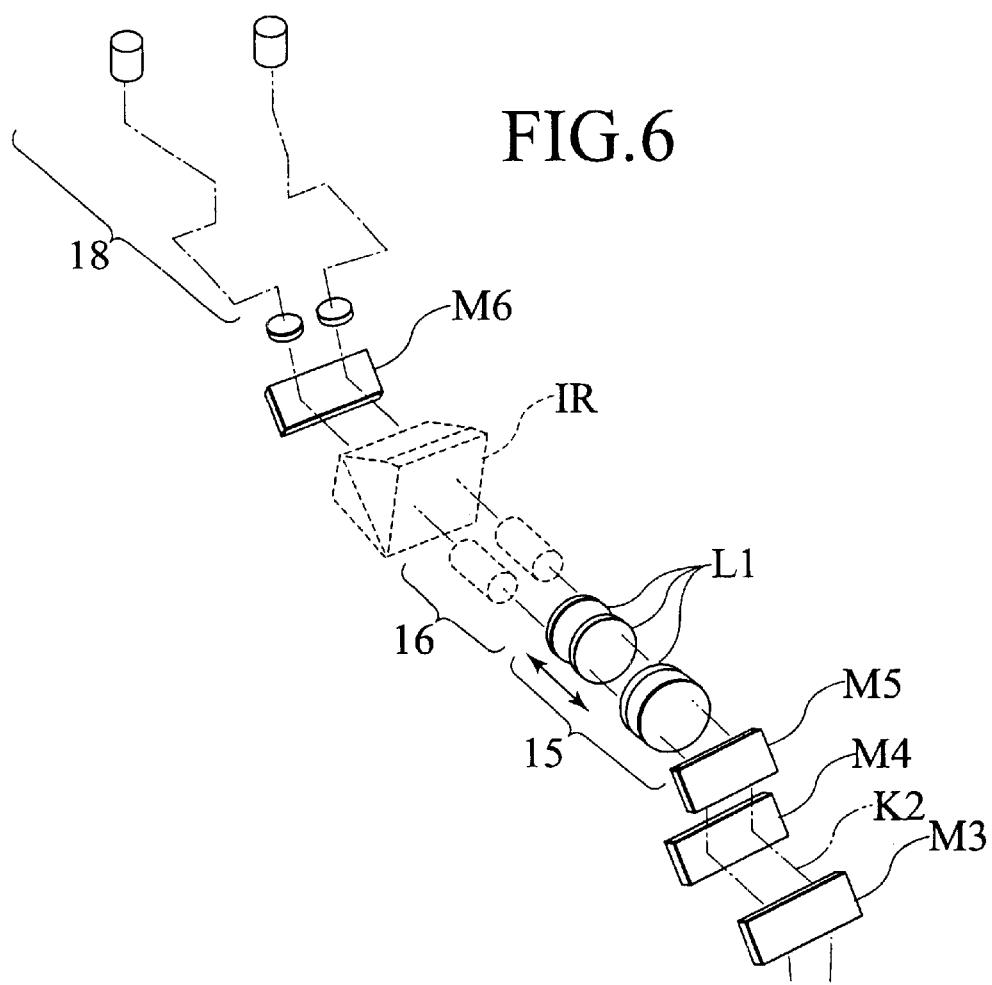
FIG. 6 is a perspective view showing the optical systems of the assistant microscope of the second embodiment.
Figure 7:
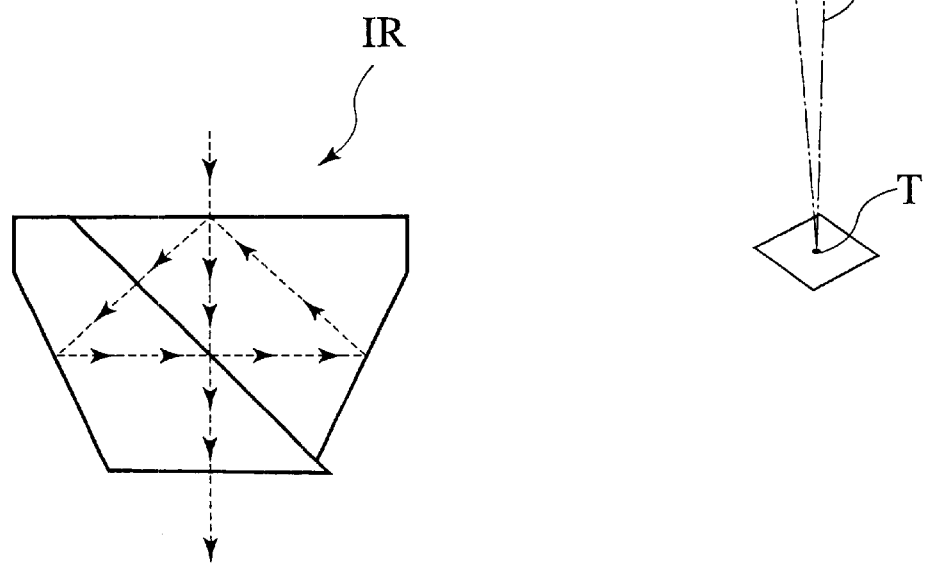
FIG. 7 is a sectional view showing an image rotator used for the second embodiment.

FIGS. 5 to 7 show an assistant microscope 26 according to the second embodiment of the present invention. The assistant microscope 26 has a crank 20 that extends away from a target T, to secure a work space S for a doctor. The assistant microscope 26 has a variable body tube 27 provided with a rotary mechanism to turn the variable body tube 27 around a horizontal axis α.

The assistant microscope 26 has a mirror M3. The mirror M3 is shifted from an optical axis of a light flux K1 introduced into an inlet opening of the body of a stereomicroscope to which the assistant microscope 26 is attached. The mirror M3 receives a light flux K4 from a target T. The angle of the mirror M3 is changed depending on a distance from the target T so that the mirror M3 may horizontally reflect the light flux K4. The angle of the mirror M3 may be changed manually or by a rotary actuator connected to a controller. The optical axis of the light flux K4 is upwardly oriented through a crank path involving three mirrors M3, M4, and M5, to secure the work space S under the assistant microscope 26.

The cranked light flux is passed through an objective system 15 and zoom system 16 that are horizontally arranged, to an image rotator IR shown in FIG. 7. Due to the image rotator IR, the variable body tube 27 is rotatable around the horizontal axis α. The light flux is passed through the image rotator IR, reflected by a mirror M6, passed through an eyepiece lens system 18 in the variable body tube 27, and forms images on eyepieces 19. Instead of branching the light flux K4 from the light flux K1 introduced into the body of the stereomicroscope, the second embodiment directly receives the light flux K4 from the target T with the use of the mirror M3. As a result, the light flux K4 has sufficient intensity to provide large and bright images. Alternatively, a branching unit H such as a half mirror or a beam splitter may be arranged to branch the light flux K4 for the assistant microscope 26 from the light flux K1 for the stereomicroscope.

In summary, the stereomicroscope of the present invention employs a vertical objective system and a horizontal zoom system to thin the width of the stereomicroscope and allow an observer to easily see a target under the stereomicroscope with the naked eye when the observer shifts his or her eyes from eyepieces of the stereomicroscope. The horizontal zoom system consists of juxtaposed two systems, to reduce the vertical size of the body of the stereomicroscope. The vertical objective system directly receives a light flux from a target without changing a main optical axis by additional optical elements. This arrangement reduces the number of parts and simplifies the peripheral structure of an inlet opening of the stereomicroscope.

The branching units B1 to B4 are properly arranged in the stereomicroscope to branch light paths so that accessories such as the stereoscopic assistant microscope 7, counter microscope 11, assistant monocular microscope 8, photographing unit 9, still camera 10, and monitor 12 may optionally be attached to the body 2 of the stereomicroscope without influencing the main optical path extending from the target T to each eyepiece 5 of the body 2. These accessories are employed to quickly change the configuration of the stereomicroscope according to surgery to carry out.

The assistant microscope of any one of the first and second embodiments is easy to detach when not needed, and the stereomicroscope without the assistant microscope is operable by itself to observe a target. If the assistant microscope is removed, an observer on the stereomicroscope may secure a wide view around the stereomicroscope when seeing a target with the naked eye. Even without the assistant microscope, the stereomicroscope is structurally complete with the inlet opening thereof being open to a target. Namely, the stereomicroscope can properly observe a target by itself. When the assistant microscope is attached to the stereomicroscope, the magnification of the assistant microscope is adjustable independently of the magnification of the stereomicroscope, so that two or more doctors may easily carry out combinational surgery with the use of the stereomicroscope and assistant microscope simultaneously.

What is claimed is:

1. A stereomicroscope comprising:
   an objective system having a vertical optical axis;
   two zooms systems horizontally juxtaposed at the same height as each other; and
   an eyepiece system disposed substantially above the objective system,
   wherein light from the zoom systems is reflected toward the vertical optical axis to pass through the eyepiece system.

2. The stereomicroscope of claim 1 further comprising an image projection unit for displaying an electronic image attachable to and detachable from a part of the stereomicroscope, the image projection unit being opposite to the eyepiece system of the stereomicroscope, wherein light from the image projection unit is optionally introduced to an optical axis of the stereomicroscope.

3. The stereomicroscope of claim 2 further comprising a shutter arranged on an optical axis of the stereomicroscope on an observation target side from a position for receiving a light flux from the image projection unit, able to block light from an observation target.

4. The stereomicroscope of claim 2 further comprising a shutter arranged between the image projection unit and an inlet opening of the stereomicroscope for receiving light from the image projection unit, able to block light from the image projection unit.

5. A stereomicroscope comprising:
   an objective system arranged vertically;
   two zoom systems horizontally juxtaposed at the same height as each other;
   an eyepiece system; and
   an assistant microscope attachable to and detachable from the stereomicroscope, the assistant microscope having an objective system, a zoom system, and an eyepiece system that are independent of those of the stereomicroscope, wherein:
      the assistant microscope is attached to an inlet opening of the stereomicroscope at an observation target side, the inlet opening receiving light from an observation target.

6. A The stereomicroscope of claim 5 further comprising an image projection unit attachable to and detachable from a part of the stereomicroscope, the image projection unit being opposite to the eyepiece system of the stereomicroscope, wherein light from the image projection unit is optionally introduced to an optical axis of the stereomicroscope.

7. The stereomicroscope of claim 6 further comprising a shutter arranged on an optical axis of the stereomicroscope on an observation target side from a position for receiving a light flux from the image projection unit, able to block light from an observation target.

8. The stereomicroscope of claim 6 further comprising a shutter arranged between the image projection unit and an inlet opening of the stereomicroscope for receiving light from the image projection unit, able to block light from the image projection unit.

9. A stereomicroscope of claim 5 further comprising:
   a second eyepiece system attachable to and detachable from the stereomicroscope, the second eyepiece system being located opposite to the eyepiece system of the stereomicroscope, wherein
      the second eyepiece system is attached to the stereomicroscope to receive light from the zoom systems.

10. A stereomicroscope comprising:
    an objective system having a vertical optical axis;
    two zoom systems horizontally juxtaposed at the same height as each other,
    an eyepiece system disposed substantially above the objective system; and
    a second eyepiece system attachable to and detachable from the stereomicroscope, the second eyepiece system being located opposite to the eyepiece system of the stereoscope,
    wherein light from the zoom systems is reflected toward the vertical optical axis to pass through the eyepiece system and the second eyepiece system is attached to the stereomicroscope to receive light from the zoom systems.

11. The stereomicroscope of claim 10 further comprising an image projection unit for displaying an electronic image attachable to and detachable from a part of the stereomicroscope, the image projection unit being opposite to the eyepiece system of the stereomicroscope, wherein light from the image projection unit is optionally introduced to an optical axis of the stereomicroscope.

12. The stereomicroscope of claim 11 further comprising a shutter arranged on an optical axis of the stereomicroscope on an observation target side from a position for receiving a light flux from the image projection unit, able to block light from an observation target.

13. The stereomicroscope of claim 11 further comprising a shutter arranged between the image projection unit and an inlet opening of the stereomicroscope for receiving light from the image projection unit, able to block light from the image projection unit.

* * * * *